United States Patent
Ree et al.

(10) Patent No.: US 11,136,470 B2
(45) Date of Patent: Oct. 5, 2021

(54) SELF-HEALING FUNCTIONAL POLYVINVYL-BASED COMPOUND AND PREPARATION METHOD THEREOF

(71) Applicants: CEKO CO., LTD., Gyeonggi-do (KR); DANKOOK UNIVERSITY CHEONAN CAMPUS INDUSTRY ACADEMIC, Chungcheongnam-do (KR); POSTECH ACADEMY-INDUSTRY FOUNDATION, Gyeonsangbuk-Do (KR)

(72) Inventors: Moon Hor Ree, Gyeongsangbuk-do (KR); Kyung Ho Kwon, Daegu (KR); Won Yeong Ryu, Jeollabuk-do (KR); Kwan Young Han, Gyeonggi-do (KR); Sung Kyoo Lim, Gyeonggi-do (KR); Byung Min Park, Daejeon (KR); Dong Hoon Jang, Chungcheongnam-do (KR); Hyun Joong Kim, Seoul (KR); Hong Chul Kim, Seoul (KR); Jeong Rae Kim, Seoul (KR)

(73) Assignees: CEKO CO., LTD., Gyeonggi-do (KR); DANKOOK UNIVERSITY CHEONAN CAMPUS INDUSTRY ACADEMIC, Chungcheongnam-do (KR); POSTECH ACADEMY-INDUSTRY FOUNDATION, Gyeonsangbuk-do (KR)

(*) Notice: Subject to any disclaimer, the term of this patent is extended or adjusted under 35 U.S.C. 154(b) by 153 days.

(21) Appl. No.: 16/605,065

(22) PCT Filed: Apr. 12, 2018

(86) PCT No.: PCT/KR2018/004286
§ 371 (c)(1),
(2) Date: Oct. 14, 2019

(87) PCT Pub. No.: WO2018/190647
PCT Pub. Date: Oct. 18, 2018

(65) Prior Publication Data
US 2021/0115174 A1  Apr. 22, 2021

(30) Foreign Application Priority Data

Apr. 13, 2017 (KR) .................. 10-2017-0047902

(51) Int. Cl.
| | | |
|---|---|---|
| C08F 220/20 | (2006.01) | |
| C08F 220/30 | (2006.01) | |
| C08F 220/34 | (2006.01) | |
| C09D 133/14 | (2006.01) | |
| C08J 7/046 | (2020.01) | |
| C08F 220/28 | (2006.01) | |
| C08F 220/56 | (2006.01) | |
| C09D 133/06 | (2006.01) | |
| C09D 133/08 | (2006.01) | |
| C08K 5/17 | (2006.01) | |
| C08K 5/18 | (2006.01) | |
| C08K 5/3445 | (2006.01) | |
| C08K 5/3462 | (2006.01) | |

(52) U.S. Cl.
CPC .......... *C09D 133/14* (2013.01); *C08F 220/20* (2013.01); *C08F 220/281* (2020.02); *C08F 220/30* (2013.01); *C08F 220/34* (2013.01); *C08F 220/56* (2013.01); *C08J 7/046* (2020.01); *C09D 133/066* (2013.01); *C09D 133/08* (2013.01); *C08K 5/175* (2013.01); *C08K 5/18* (2013.01); *C08K 5/3445* (2013.01); *C08K 5/3462* (2013.01)

(58) Field of Classification Search
CPC .... C08F 220/20; C08F 220/30; C08F 220/34; C08F 220/281; C08F 220/18; C08F 220/26; C09D 133/14; C09D 133/066; C09D 133/08
See application file for complete search history.

(56) References Cited

U.S. PATENT DOCUMENTS

| | | | | |
|---|---|---|---|---|
| 2009/0258048 A1* | 10/2009 | Ward | ................. | C08G 18/0895 424/423 |
| 2014/0243428 A1* | 8/2014 | Varghese | ................ | A61L 24/06 514/772.6 |
| 2020/0216581 A1* | 7/2020 | Suh | ........................ | C08F 2/44 |

FOREIGN PATENT DOCUMENTS

| | | |
|---|---|---|
| JP | 2015-130496 A | 7/2015 |
| KR | 10-2004-0005997 A | 1/2004 |
| KR | 10-2012-0076149 A | 7/2012 |
| KR | 10-1168038 B1 | 7/2012 |
| KR | 10-2012-0109248 A | 10/2012 |
| KR | 10-2014-0063790 A | 5/2014 |
| KR | 10-1498361 B1 | 3/2015 |

(Continued)

OTHER PUBLICATIONS

Lee et al; "Enhancement of self-healing... materials", Macromolecular Research; 25(6), pp. 640-647. (Year: 2017).*

(Continued)

*Primary Examiner* — Karuna P Reddy
(74) *Attorney, Agent, or Firm* — Harness, Dickey & Pierce, P.L.C.

(57) ABSTRACT

The present invention relates to a polyvinyl-based compound, which maximizes self-healing ability by introducing various functional molecules into a brush of a polyvinyl-based resin, a preparation method thereof, and a polymer coating film produced therefrom.

5 Claims, 3 Drawing Sheets

(56) References Cited

FOREIGN PATENT DOCUMENTS

| | | |
|---|---|---|
| KR | 10-2015-0049852 A | 5/2015 |
| KR | 10-2015-0097902 A | 8/2015 |
| KR | 10-2015-0111411 A | 10/2015 |
| KR | 10-2016-0028556 A | 3/2016 |
| WO | WO-2017209486 A1 * | 12/2017 |

OTHER PUBLICATIONS

Smeets, Niels M.B. (2013) "Amphiphilic hyperbranched polymers from the copolymerization of a vinyl and divinyl monomer: The potential of catalytic chain transfer polymerization." *European Polymer Journal*, 49(9):2528-2544, Sep. 2013.

International Search Report dated Nov. 26, 2018 issued in International Patent Application No. PCT/KR2018/004286, with English translation.

* cited by examiner

SELF-HEALING FUNCTIONAL POLYVINVYL-BASED COMPOUND AND PREPARATION METHOD THEREOF

CROSS-REFERENCE TO RELATED APPLICATIONS

This application is a national phase application of PCT Application No. PCT/KR2018/004286, filed on 12 Apr. 2018, which claims the benefit and priority to Korean Patent Application No. 10-2017-0047902, filed on 13 April 2017. The entire disclosures of the applications identified in this paragraph are incorporated herein by references.

FIELD

The present invention relates to a self-healing functional polyvinyl-based compound and preparation method thereof.

BACKGROUND

Conventionally known methods for self-healing, such as scratches formed on polymer coating film, can be largely divided into two methods.

One is the method of introducing healing agents in the form of capsules (capsular system) or the form of vascular bundle (vascular system), and when microdamage is caused by external force, the healing agent leaks and fills the damaged area (Korean Patent Laid-open Publication Nos. 10-2004-005997 and 10-2015-0049852, and Korean Patent Publication Nos. 10-1168038 and 10-1498361). The other is the method of restoring microdamage by elasticity, chain mobility, photoreactive functional group, thermally reactive functional group, non-covalent functional group, etc. of the material itself without the help of an external healing agent (Korean Patent Laid-open Publication Nos. 10-2012-0076149, 10-2015-0097902 and 10-2016-0028556).

The first method of recovery using the healing agents introduced in the capsules and vascular bundles can recover a wide range of damage, but there are limitations to repeated recovery and integrity of the healing agents.

In order to overcome these drawbacks and to give repetitive recovery to self-healing substances, much research has been done to improve the recovery ability of the material itself by introducing elasticity of the material itself, polymer chain mobility, light/heat-reactive functional group and supramolecular molecules to the material.

In particular, there is a need for a repetitive recovery ability to be applied as a surface protection material for electronic devices and display devices, which are essential elements in modern society, and the ability to restore the inherent properties of material after recovery.

Thus, self-healing brush polymers using brush polymers are a potent material that can meet the aforementioned requirements.

PRIOR ART DOCUMENTS

Patent Publication (Patent Publication 1) Korean Patent Laid-open Publication No. 102004005997
(Patent Publication 2) Korean Patent Laid-open Publication No. 1020150049852
(Patent Publication 3) Korean Patent Publication No. 101168038
(Patent Publication 4) Korean Patent Publication No. 101498361
(Patent Publication 5) Korean Patent Laid-open Publication No. 1020120076149
(Patent Publication 6) Korean Patent Laid-open Publication No. 1020150097902
(Patent Publication 7) Korean Patent Laid-open Publication No. 1020160028556

SUMMARY

Technical Purpose

The purpose of the present invention is to provide a polyvinyl-based compound which maximizes self-healing ability by introducing various functional molecules into a brush of polyvinyl-based resin, a method for producing the same, and a polymer coating film prepared therefrom.

Technical Solution

In order to achieve the technical purpose, the present invention provides a self-healing functional polyvinyl-based compound comprising a structure represented by the following Formula 1:

[Formula 1]

wherein,
$R_1$ and $R_2$ are hydrogen or an aliphatic or aromatic derivative having 1 to 20 carbon atoms; m and n represent the number of polyvinyl-based compound units, wherein $0 \leq m < 1000$, $0 \leq n < 1000$, and $5 \leq (m+n) \leq 2000$;
Z is an aliphatic or aromatic derivative having 1 to 20 carbon atoms,
A is any one selected from a group consisting of —OH, —NH$_2$, —COOH, —Cl, —Br, —I and an aliphatic or aromatic derivative having 1 to 20 carbon atoms; and
W is 2 to 10 chemical derivatives selected from the group consisting of the chemical derivatives described below, wherein R is hydrogen or an aliphatic or aromatic derivative having 1 to 20 carbon atoms.

-continued

-continued

In the second aspect, the present invention provides a method for preparing a self-healing functional polyvinyl-based compound, comprising the steps of:

step (1) of preparing a polyvinyl-based compound of Formula 4 by a radical polymerization reaction of a vinyl-based monomer represented by Formula 3; and step (2) of preparing a self-healing functional polyvinyl-based compound represented by Formula 1 by a condensation reaction of a polyvinyl-based compound of Formula 4 with a chemical derivative described below:

[Formula 1]

[Formula 3]

[Formula 4]

wherein, $R_1$ and $R_2$ are hydrogen or an aliphatic or aromatic derivative having 1 to 20 carbon atoms;

$R_3$ is an aliphatic or aromatic derivative having 1 to 20 carbon atoms; m and n represent the number of polyvinyl-based compound units, wherein $0 \leq m < 1000$, $0 \leq n < 1000$, and $5 \leq (m+n) \leq 2000$;

X represents the number of repeating units of the polyvinyl-based compound, and is 5 to 50,000;

Z is an aliphatic or aromatic derivative having 1 to 20 carbon atoms,

A is any one selected from a group consisting of —OH, —NH$_2$, —COOH, —Cl, —Br, —I and an aliphatic or aromatic derivative having 1 to 20 carbon atoms; and

W is 2 to 10 chemical derivatives selected from the group consisting of the chemical derivatives described below, wherein R is hydrogen or an aliphatic or aromatic derivative having 1 to 20 carbon atoms.

In the third aspect, the present invention provides a polymer thin film formed by coating the above self-healing functional polyvinyl-based compound on a substrate.

Advantageous Effects

The self-healing polyvinyl-based compound of the present invention provides repetitive recovery ability by using self-healing functional molecules introduced into the brush, as well as intrinsic properties such as elasticity and chain flexibility of the material itself, and maximize recovery ability through the complex complement of covalent and non-covalent bonds. It is expected that this effective self-healing will be applicable as a surface protection material. In addition, by introducing the polyvinyl-based to polymer backbone, it is possible to maximize the physical properties of the polymer material by improving the glass transition temperature and hardness of the polymer material.

DETAILED DESCRIPTION

The present invention will be described in detail in below.

A self-healing functional polyvinyl-based compound comprises a structure represented by the following Formula 1:

[Formula 1]

wherein,
$R_1$ and $R_2$ are hydrogen or an aliphatic or aromatic derivative having 1 to 20 carbon atoms; m and n represent the number of polyvinyl-based compound units, wherein $0 \leq m < 1000$, $0 \leq n < 1000$, and $5 \leq (m+n) \leq 2000$;

Z is an aliphatic or aromatic derivative having 1 to 20 carbon atoms, A is any one selected from a group consisting of —OH, —NH$_2$, —COOH, —Cl, —Br, —I and an aliphatic or aromatic derivative having 1 to 20 carbon atoms; and

W is 2 to 10 chemical derivatives selected from the group consisting of the chemical derivatives described below, wherein R is hydrogen or an aliphatic or aromatic derivative having 1 to 20 carbon atoms.

-continued

E =

-continued

G =

Z is an aliphatic or aromatic derivative selected from the group consisting of —CH$_2$SRO—, —CH$_2$SROCO—, —CH$_2$SRCOO—, —CH$_2$SRO—, —CH$_2$SRNHCO—, —CH$_2$SROCO(CH$_2$)$_2$OCO—, —CH$_2$SRCO—, —CH$_2$SO$_2$RO—, —CH$_2$SO$_2$ROCO—, —CH$_2$SO$_2$RCOO—, —CH$_2$SO$_2$RNHCO—, —CH$_2$SO$_2$ROCO(CH$_2$)$_2$OCO—, —CH$_2$SO$_2$RCO—, —OCORO—, —OCOROCO—, —OCORCOO—, —OCORNHCO—, —OCOROCO(CH$_2$)$_2$OCO—, —OCORCO—, —COORO—, —COOROCO—, —COORCOO—, —COORNHCO—, —COOROCO(CH$_2$)$_2$OCO—, —COORCO—, —ORO—, —OROCO—, —ORCOO—, —ORNHCO—, —OROCO(CH$_2$)$_2$OCO—, —ORCO—, —NHROCO—, —NHRCOO—, —NHRNHCO—, —NHROCO(CH$_2$)$_2$OCO—, —CH$_2$RO—, —CH$_2$ROCO—, —CH$_2$RCOO—, —CH$_2$RNHCO—, —CH$_2$ROCO(CH$_2$)$_2$OCO—, —OC$_6$H$_4$RO—, —OC$_6$H$_4$ROCO—, —OC$_6$H$_4$RCOO—, —OC$_6$H$_4$RNHCO—, —OC$_6$H$_4$ROCO(CH$_2$)$_2$OCO—. —OC$_6$H$_4$RCO—, —OC$_6$H$_4$COOROCO—, —OC$_6$H$_4$COORCOO—, —OC$_6$H$_4$COORO—, —OC$_6$H$_4$COORNHCO—, —OC$_6$H$_4$COOROCO(CH$_2$)$_2$OCO—, —OC$_6$H$_4$COORCO—, —OC$_6$H$_4$CONHROCO—, —OC$_6$H$_4$CONHRCOO—, —OC$_6$H$_4$CONHRO—, —OC$_6$H$_4$CONHRNHCO—, —OC$_6$H$_4$CONHROCO(CH$_2$)$_2$OCO— and —OC$_6$H$_4$CONHRCO—, wherein R is hydrogen or an aliphatic derivative having 1 to 20 carbon atoms.

A is an aliphatic or aromatic derivative selected from the group consisting of —OH, —NH$_2$, —COOH, —Cl, —Br, —I, —CH$_3$, —CH$_2$OH, —CH$_2$NH$_2$, —CH$_2$COOH, —CH$_2$Cl, —CH$_2$Br, —CH$_2$I, —CH$_2$CH$_3$, —CH$_2$CH$_2$OH, —CH$_2$CH$_2$NH$_2$, —CH$_2$CH$_2$COOH, —CH$_2$CH$_2$Cl, —CH$_2$CH$_2$Br, —CH$_2$CH$_2$I, —CH$_2$CH$_2$CH$_3$, —CH$_2$CH$_2$CH$_2$OH, —CH$_2$CH$_2$CH$_2$NH$_2$, —CH$_2$CH$_2$CH$_2$COOH, —CH$_2$CH$_2$CH$_2$Cl, —CH$_2$CH$_2$CH$_2$Br, —CH$_2$CH$_2$CH$_2$I, —C$_6$H$_4$OH, —C$_6$H$_4$NH$_2$, —C$_6$H$_4$COOH, —C$_6$H$_4$Cl, —C$_6$H$_4$Br, —C$_6$H$_4$I, —C$_6$H$_4$CH$_3$, —C$_6$H$_4$CH$_2$OH, —C$_6$H$_4$CH$_2$NH$_2$, —C$_6$H$_4$CH$_2$COOH, —C$_6$H$_4$CH$_2$Cl, —C$_6$H$_4$CH$_2$Br, —C$_6$H$_4$CH$_2$I, —C$_6$H$_4$CH$_2$CH$_3$, —C$_6$H$_4$CH$_2$CH$_2$OH, —C$_6$H$_4$CH$_2$CH$_2$NH$_2$, —C$_6$H$_4$CH$_2$CH$_2$COOH, —C$_6$H$_4$CH$_2$CH$_2$Cl, —C$_6$H$_4$CH$_2$CH$_2$Br, —C$_6$H$_4$CH$_2$CH$_2$I, —C$_6$H$_4$CH$_2$CH$_2$CH$_3$, —C$_6$H$_4$CH$_2$CH$_2$CH$_2$OH, —C$_6$H$_4$CH$_2$CH$_2$CH$_2$NH$_2$, —C$_6$H$_4$CH$_2$CH$_2$CH$_2$COOH, —C$_6$H$_4$CH$_2$CH$_2$CH$_2$Cl, —C$_6$H$_4$CH$_2$CH$_2$CH$_2$Br, —C$_6$H$_4$CH$_2$CH$_2$CH$_2$I, —CH$_2$C$_6$H$_4$OH, —CH$_2$C$_6$H$_4$NH$_2$, —CH$_2$C$_6$H$_4$COOH, —CH$_2$C$_6$H$_4$Cl, —CH$_2$C$_6$H$_4$Br, —CH$_2$C$_6$H$_4$I, —CH$_2$CH$_2$C$_6$H$_4$OH, —CH$_2$CH$_2$C$_6$H$_4$NH$_2$, —CH$_2$CH$_2$C$_6$H$_4$COOH, —CH$_2$CH$_2$C$_6$H$_4$Cl, —CH$_2$CH$_2$C$_6$H$_4$Br, —CH$_2$CH$_2$C$_6$H$_4$I, —CH$_2$CH$_2$CH$_2$C$_6$H$_4$OH, —CH$_2$CH$_2$CH$_2$C$_6$H$_4$NH$_2$, CH$_2$CH$_2$CH$_2$C$_6$H$_4$COOH, —CH$_2$CH$_2$CH$_2$C$_6$H$_4$Cl, —CH$_2$CH$_2$CH$_2$C$_6$H$_4$Br and —CH$_2$CH$_2$CH$_2$C$_6$H$_4$I.

W is 2 to 10 chemical derivatives, preferably 2 to 5 chemical derivatives selected from the group consisting of the chemical derivatives described below, wherein R is hydrogen or an aliphatic or aromatic derivative having 1 to 20 carbon atoms.

-continued

The self-healing functional polyvinyl-based compound of the present invention may have a weight average molecular weight of 5,000 to 5,000,000.

Specific examples of the self-healing polyvinyl-based compound of the present invention include compounds represented by the following Formula 2. The compound of Formula 2 is represented as an example of introducing four self-healing functional molecules selected from the group consisting of the chemical derivative of W shown in Formula 1. However the self-healing functional polyvinyl-based compound introduced in the present invention is not limited to the polymer compound shown by Formula 2.

[Formula 2]

l, o, p, q and r represent the number of polyvinyl-based units in the polyvinyl-based compound of Formula 2 having the self-healing functional molecules as a brush ends, wherein l, o, p, q and r are 0<l≤400, 0<o≤400, 0<p≤400, 0<q≤400, 0<r≤400, and 5≤(l+o+p+q+r)≤2000; preferably, 0<l≤100, 0<o≤100, 0<p≤100, 0<q≤100 and 0<r≤100.

The self-healing polyvinyl-based compound according to the present invention is an economical material which can be easily processed and easily coated on various substrates, and a polymer thin film can be easily prepared using the self-healing polyvinyl compound. In addition, the polymer thin film can recover the micro-damage of the surface by the self-healing properties of the polymer—in particular, the self-healing functional molecules to maximize the recovery capacity and iteratively effective recovery.

In another aspect, the present invention provides a method for preparing a self-healing functional polyvinyl-based compound, comprising the steps of:

step (1) of preparing a polyvinyl-based compound of Formula 4 by a radical polymerization reaction of a vinyl-based monomer represented by Formula 3; and step (2) of preparing a self-healing functional polyvinyl-based compound represented by Formula 1 by a condensation reaction of a polyvinyl-based compound of Formula 4 with a chemical derivative described below:

[Formula 1]

wherein, $R_1$ and $R_2$ are hydrogen or an aliphatic or aromatic derivative having 1 to 20 carbon atoms;

$R_3$ is an aliphatic or aromatic derivative having 1 to 20 carbon atoms; m and n represent the number of polyvinyl-based compound units, wherein $0 \leq m < 1000$, $0 \leq n < 1000$, and $5 \leq (m+n) \leq 2000$;

X represents the number of repeating units of the polyvinyl-based compound, and is 5 to 50,000;

Z is an aliphatic or aromatic derivative having 1 to 20 carbon atoms,

A is any one selected from a group consisting of —OH, —NH$_2$, —COOH, —Cl, —Br, —I and an aliphatic or aromatic derivative having 1 to 20 carbon atoms; and W is 2 to 10 chemical derivatives selected from the group consisting of the chemical derivatives described below, wherein R is hydrogen or an aliphatic or aromatic derivative having 1 to 20 carbon atoms.

G =

In the above, $R_3$ is an aliphatic or aromatic derivative having 1 to 20 carbon atoms; X represents the number of repeating units of the polyvinyl-based compound, and is 5 to 50,000, preferably 50 to 50,000; and Z is an aliphatic or aromatic derivative having 1 to 20 carbon atoms.

In step (1) of the method of the present invention, the polyvinyl-based compound of Formula 4 can be prepared by a radical polymerization reaction—specifically, RAFT polymerization—of a vinyl-based monomer represented by Formula 3. In the embodiment of the present invention, RAFT polymerization may polymerize a polyvinyl-based compound using a radical initiator and a chain transfer agent. Dimethylacetamide, dimethylformamide, toluene or a mixed solution thereof may be used as the solvent. Step (1) can be carried out at a temperature of −100° C. to 100° C. and a pressure of 1 to 5 atm.

In step (2) of the method of the present invention, the self-healing functional polyvinyl-based compound represented by Formula 1 can be prepared by a condensation reaction of a polyvinyl-based compound of Formula 4 (specifically, a hydroxyl group (—OH) of the polyvinyl-based compound) with the chemical derivative represented by W in Formula 1. Dimethylacetamide, dimethylformamide, diethyl ether, dichloromethane, tetrahydrofuran or a mixed solution thereof may be used as the solvent.

Another aspect of the present invention provides a polymer thin film formed by coating the above self-healing functional polyvinyl-based compound on a substrate.

Not particularly limited, the coating can be performed by any method selected from the group consisting of spin coating, drop coating, bar coating, spray coating, electrostatic coating, dip coating, blade coating, inkjet coating and roll coating.

BEST MODE

The present invention will be described in more detail through the following Synthesis Examples and Examples. However, these Synthesis Examples and Examples are only intended to describe the present invention exemplarily, and the scope of the present invention is not at all limited by them. Those skilled in the art could apply various bonding groups or substituents included in the present invention to prepare polyvinyl-based compounds having various substituents within the scope of the present invention.

EXAMPLE

Synthesis Example 1

5 mL of 4-hydroxybutyl methacrylate was added to a 100 mL round bottom flask and dissolved in 17 mL of dimethylformamide under a nitrogen atmosphere. 3 mg of initiator and 10 mg of chain transfer agent were added to the mixed solution, followed by stirring at 60° C. for 24 hours. After the reaction was completed, the mixed solution was precipitated and purified by diethyl ether, and dried for 8 hours under vacuum at 40° C. to prepare poly(4-hydroxybutyl methacrylate). Yield: 70%. The product was confirmed by nuclear magnetic resonance spectroscopy. $^1$H-NMR (300 MHz, DMSO-$d_6$): δ(ppm)=4.8 (br, —OH), 4.11-3.75 (br, 2H, —COOCH$_2$—), 3.75-3.44 (br, 2H, —CH$_2$OH), 2.44-0.47 (m, —CH$_2$C(CH$_3$)—, —CH$_2$C(CH$_3$)—).

Synthesis Example 2

1.50 g of 3,5-dimethylpyrazole and 2.0 mL of triethylamine were added together in a 100 mL round bottom flask, and completely dissolved in 40 mL of tetrahydrofuran, followed by stirring for 1 hour. 0.780 g of triphosgene was dissolved in 20 mL of tetrahydrofuran and added to the mixed solution, followed by stirring for 12 hours. After the reaction was completed, the organic solvent from which the precipitate was removed through a reduced pressure filter was removed by heating under reduced pressure. The sol- vent was removed, and the remaining oil was precipitated in pentane, and the white precipitate was dried in vacuum to obtain a product. Yield: 70%. The product was confirmed by nuclear magnetic resonance spectroscopy. 1H-NMR (300 MHz, CDCl$_3$): δ(ppm)=6.01 (s, 2H), 2.50 (s, 6H), 2.30 (s, 6H).

Synthesis Example 3

In a 100 mL round bottom flask, 0.22 g of the product obtained in Synthesis Example 2 and 0.500 g of 4-aminobenzoic acid were added and dissolved together in 10 mL of acetonitrile. After the mixed solution was stirred for 12 hours, the resulting precipitate was removed through a reduced pressure filter. The solvent was removed by heating under reduced pressure, and the obtained mixed solution was dried in vacuum to obtain a product. Yield 80%. The product was confirmed by nuclear magnetic resonance spectroscopy. 1H-NMR (300 MHz, DMSO-d$_6$): δ(ppm)=10.20 (s, 1H), 10.00-8.80 (br, 1H), 7.90 (t, 4H), 6.20 (s, 1H), 2.50 (s, 3H), 2.25 (s, 3H).

Synthesis Example 4

In a 100 mL round bottom flask, 0.63 g of 6-methylisocytosine and 1.30 g of carbonyldiimidazole were completely dissolved in 10 mL of dimethyl sulfoxide, and the mixed solution was stirred at 60° C. for 2 hours. After the reaction was completed, the reactants were cooled to room temperature and produced precipitates were collected through a reduced pressure filter and dried in vacuum.

0.5 g of the material obtained above was dispersed in tetrahydrofuran, and 0.35 g of β-alanine ethyl ester hydrochloride and 0.60 mL of triethylamine were added thereto, and the mixture was stirred at 60° C. for 12 hours. After the reaction, the organic solvent was removed by heating under reduced pressure and purified by silica gel chromatography (methanol and chloroform of 2:98). Yield 80%. The product was confirmed by nuclear magnetic resonance spectroscopy. 1H-NMR (300 MHz, CDCl3): δ(ppm)=13.01 (s, 1H), 11.90 (s, 1H), 10.32 (s, 1H), 5.80 (s, 1H), 4.10 (q, 2H), 3.56 (q, 2H), 2.63 (t, 2H), 2.22 (s, 3H), 1.24 (s, 3H).

2 g of the material obtained above was dispersed in 5 mL of distilled water, and 1.25 g of lithium hydroxide was added to the dispersion solution and stirred at room temperature for 12 hours. After completion of the reaction, the mixture was adjusted to pH 2 using a 1N aqueous hydrochloric acid solution, and the resulting precipitate was collected using a reduced pressure filter and dried in vacuum to obtain a white product. Yield 80%. The product was confirmed by nuclear magnetic resonance spectroscopy. $^1$H-NMR (300 MHz, DMSO-d$_6$): δ(ppm)=12.01-10.40 (s, 2H), 7.74 (s, 1H), 5.80 (s, 1H), 3.56 (q, 2H), 2.43 (t, 2H), 2.08 (s, 3H).

Example 1. Preparation of Self-Healing Polyvinyl-Based Compounds 250 mg of the polymer compound obtained in Synthesis Example 1 and 117 mg of N-acetylglycine, 148 mg of cinnamic acid, 240 mg of the compound obtained in Synthesis Example 3, 240 mg of the compound obtained in Synthesis Example 4, 360 mg of N-(3-dimethylaminopropyl)-N'-ethylcarbodiimide hydrochloride and 180 mg of 4-(dimethylamino) pyridine were dissolved in 10 mL of dimethylformamide and stirred with heating at 50° C. for 24 hours. After the reaction was completed, the mixture was cooled to room temperature and precipitated in 200 mL methanol/distilled water (methanol=20 Vol %: distilled water=80 Vol %), and the precipitated solvent was removed. The remaining solid material was dissolved in dichloromethane to remove moisture with magnesium sulfite. The solvent from which moisture was removed was removed by heating under reduced pressure and dried in vacuum.

Example 2. Preparation of Polymer Thin Film

After dissolving the polymer prepared in Example 1 in a chloroform solvent to prepare a 17 wt % solution, the polymer filter film was spin-coated, drop-coated or bar-coated on a glass slide with the solution filtered through a 0.2 micro-filter syringe filter. After this, a polymer thin film of 30 micrometers thick was formed by drying for 12 hours at 50° C. in vacuum.

Experimental Example. Evaluation of Self-Healing Property of Polymer Thin Film

The self-healing properties of the polymer thin film prepared above were evaluated by the following method.

First, two conditions, heat treatment and UV irradiation, were used to evaluate the self-healing characteristics. In order to measure the degree of microdamage repair on the surface of the brush polymer thin film, the microdamage was applied to the surface by using a nano indenter, and in the aforementioned heat treatment process, the heat treatment was performed by adjusting the time at 100° C. for 1 to 5 hours in a nitrogen atmosphere. In the UV irradiation process, the UV irradiation time was controlled by using a UV exposure device by adjusting the irradiation time in the range of 1 minute to 1 hour. Subsequently, the thickness change of the surface of the polymer thin film was measured using a surface level measuring instrument. The image was obtained using an optical microscope camera, and the self-healing property was evaluated by comparing the difference before and after heat treatment and UV irradiation. The results are shown in FIGS. 2 and 3, respectively.

Figure 1:
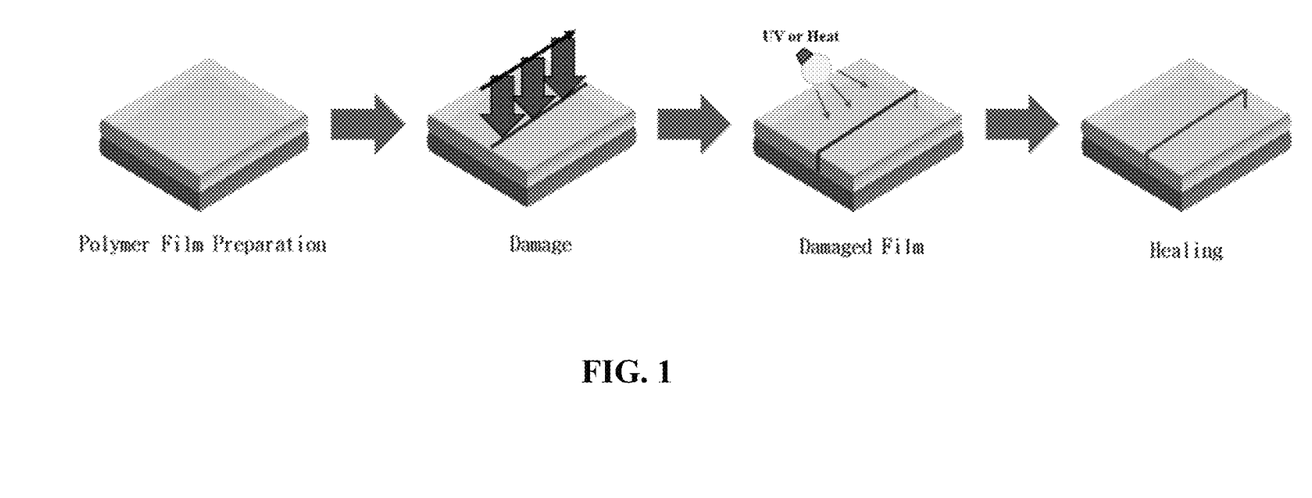
FIG. 1 is a schematic diagram illustrating self-healing properties of a polymer thin film according to an embodiment of the present invention.
Figure 2:
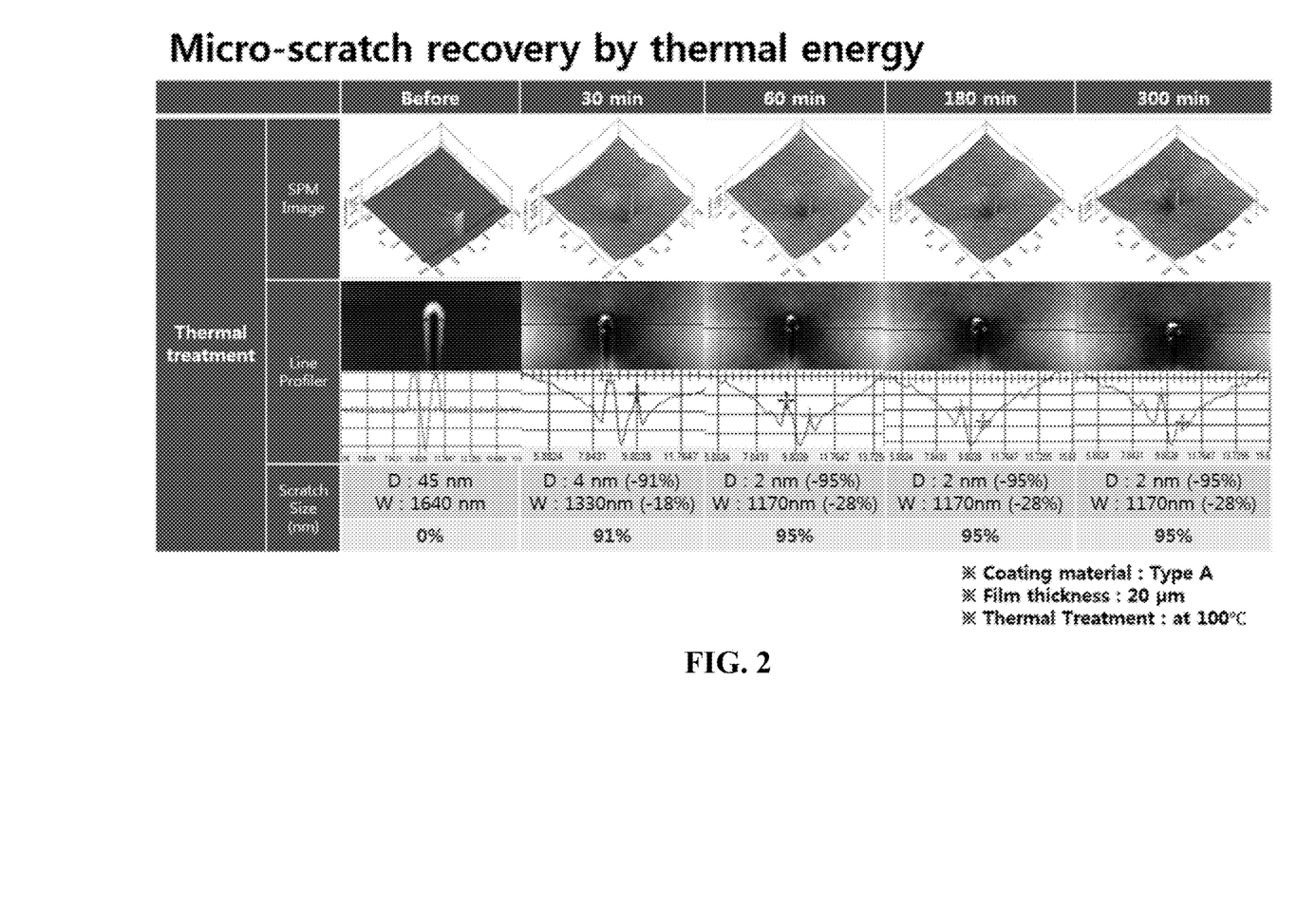
FIG. 2 is a graph showing the thickness change of the surface of the polymer thin film according to the heat treatment time measured by the surface level measuring device for the self-healing polymer thin film of the present invention and an image of the surface of the polymer thin film.

In FIG. 2, when the polymer thin film was heat-treated at 100° C., it was confirmed that the width and depth of the microdamage were reduced. In particular, the depth was reduced to about 30%, and the width was reduced to 90% even in the heat treatment in a short time of 30 minutes, and it can be seen that the thin film of the self-healing polymer of the present invention shows excellent self-healing ability.

Figure 3:
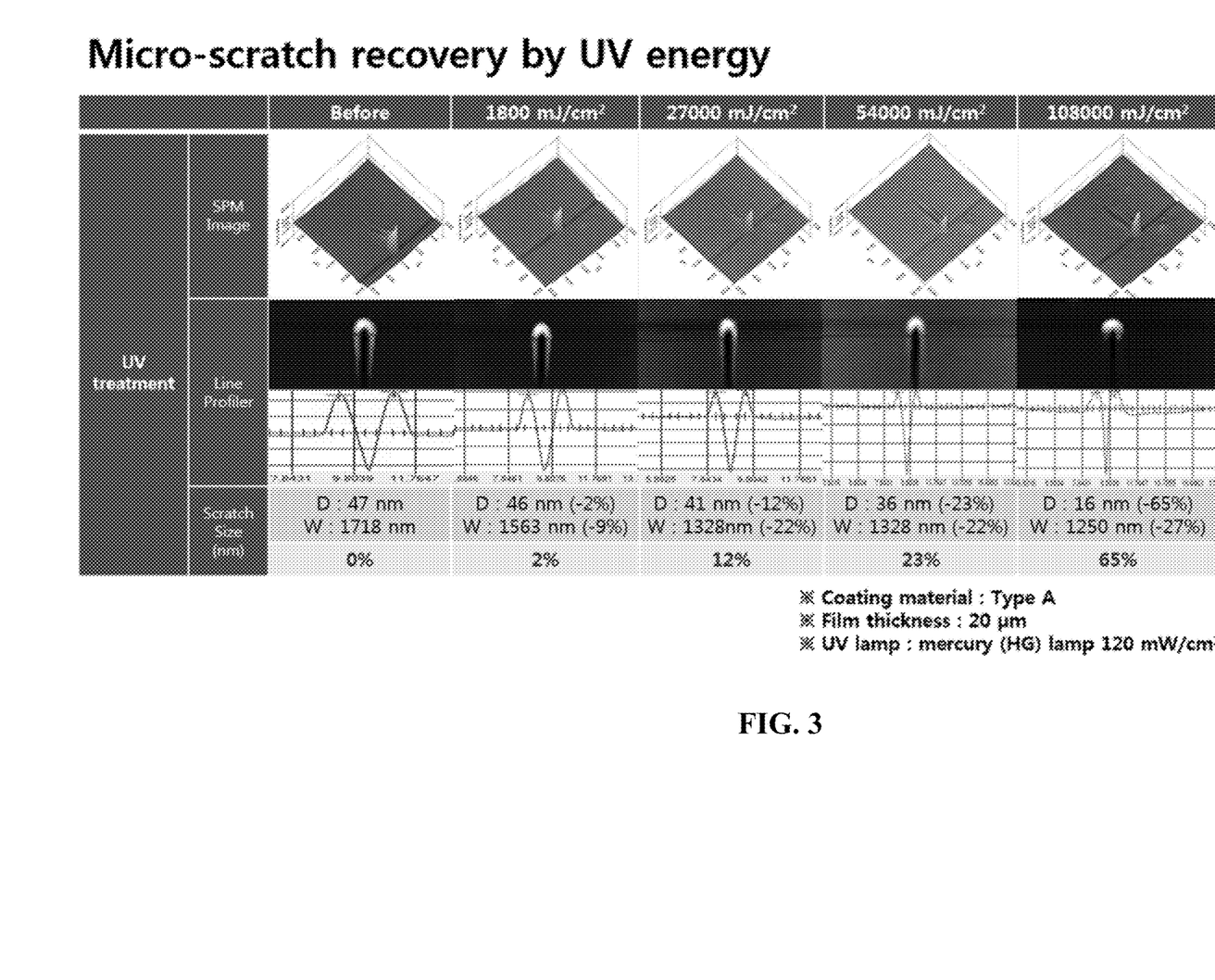
FIG. 3 is a graph showing the thickness change of the surface of the polymer thin film according to the size of the UV energy measured by the surface level measuring device for the self-healing polymer thin film of the present invention and an image of the surface of the polymer thin film.

In the case of UV irradiation to the polymer thin film in FIG. 3 (for 1 minute, 15 minutes, 30 minutes and 60 minutes), the width and depth were reduced. It was confirmed that the width and depth were greatly reduced as a whole according to UV exposure time of the UV exposure machine. In particular, when irradiated for 1 hour, the width was greatly reduced to 65% and the depth was reduced to about 30%, and the self-healing polymer showed excellent self-healing ability by UV treatment.

In the present invention, by introducing a self-healing functional molecule to a polyvinyl-based polymer compound, a polymer material having both excellent physical properties and self-healing ability has been provided. Also through the above self-healing property evaluation, the excellent recovery ability by heat and UV treatment in a short time was confirmed.

What is claimed is:

1. A self-healing functional polyvinyl-based compound comprising a structure represented by the following Formula 2:

[Formula 2]

wherein,
l, o, p, q and r are 0<l≤400, 0<o≤400, 0<p≤400, 0<q≤400, 0≤r<400, and 5≤(l+o+p+q+r)≤2000.

2. The self-healing functional polyvinyl-based compound according to claim 1, having a weight average molecular weight of 5,000 to 5,000,000.

3. A polymer thin film formed by coating a self-healing functional polyvinyl-based compound according to claim 1 on a substrate.

4. The polymer thin film according to claim 3, wherein the coating is performed by any method selected from the group consisting of spin coating, drop coating, bar coating, spray coating, electrostatic coating, dip coating, blade coating, inkjet coating and roll coating.

5. The polymer thin film according to claim 3, wherein the self-healing functional polyvinyl-based compound has a weight average molecular weight of 5,000 to 5,000,000.

* * * * *